US006944642B1

(12) United States Patent
Hopmann et al.

(10) Patent No.: US 6,944,642 B1
(45) Date of Patent: *Sep. 13, 2005

(54) SYSTEMS AND METHODS FOR DETECTING AND RESOLVING RESOURCE CONFLICTS

(75) Inventors: Alexander I. Hopmann, Seattle, WA (US); Becky Anderson, Redmond, WA (US); Brian J. Deen, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/412,738

(22) Filed: Oct. 4, 1999

(51) Int. Cl.[7] .............................................. G06F 15/16
(52) U.S. Cl. ...................................... 709/203; 718/104
(58) Field of Search ................................ 707/201, 100, 707/8, 103 R, 10; 709/222, 205, 221, 235, 328, 203; 710/8, 200; 713/201; 370/216

(56) References Cited

U.S. PATENT DOCUMENTS

| | | | | |
|---|---|---|---|---|
| 4,853,843 A | * | 8/1989 | Ecklund ..................... | 707/203 |
| 5,483,588 A | * | 1/1996 | Eaton et al. ............ | 379/202.01 |
| 5,600,834 A | * | 2/1997 | Howard ...................... | 707/201 |
| 5,737,601 A | | 4/1998 | Jain et al. .................... | 395/617 |
| 5,806,074 A | * | 9/1998 | Souder et al. .............. | 707/201 |
| 5,812,773 A | | 9/1998 | Norin .................... | 395/200.34 |
| 5,812,793 A | | 9/1998 | Shakib et al. .......... | 395/200.31 |
| 5,832,512 A | * | 11/1998 | Mastors et al. ............. | 707/202 |
| 5,924,096 A | * | 7/1999 | Draper et al. ................. | 707/10 |
| 6,049,799 A | * | 4/2000 | Mangat et al. ................ | 707/10 |
| 6,085,198 A | * | 7/2000 | Skinner et al. ......... | 707/103 R |
| 6,182,117 B1 | * | 1/2001 | Christie et al. ............. | 709/205 |
| 6,240,414 B1 | * | 5/2001 | Beizer et al. .................. | 707/8 |
| 6,256,740 B1 | * | 7/2001 | Muller et al. ............... | 713/201 |
| 6,289,410 B1 | * | 9/2001 | Cummins ................... | 710/200 |
| 6,377,540 B1 | * | 4/2002 | Hogberg et al. ............ | 370/216 |
| 6,430,564 B1 | * | 8/2002 | Judge et al. ................. | 707/100 |
| 6,457,065 B1 | * | 9/2002 | Rich et al. ................... | 709/328 |
| 6,578,054 B1 | * | 6/2003 | Hopmann et al. .......... | 707/201 |
| 6,578,069 B1 | * | 6/2003 | Hopmann et al. .......... | 709/203 |

OTHER PUBLICATIONS

Borenstein, et al., RFC 1521, "MIME (Multipurpose Internet Mail Extensions) Part One: Mechanisms for Specifying and Describing the Format of Internet Message Bodies," Sep. 1993.

Fielding, et al., RFC 2068, "Hypertext Transfer Protocol—HTTP/1.1," Jan. 1997.

Slein, et al., RFC 2291, "Requirements for a Distributed Authoring and Versioning Protocol For the World Wide Web," Feb. 1998.

(Continued)

*Primary Examiner*—John Follansbee
*Assistant Examiner*—Dustin Nguyen
(74) *Attorney, Agent, or Firm*—Workman Nydegger

(57) ABSTRACT

The present invention provides systems and methods for detecting and resolving resource conflicts. A resource conflict exists when a client version of a resource differs from a server version of the same resource. A resource conflict primarily arises when a client attempts to upload an altered resource to a server where the server version of the resource is no longer equivalent to the version that the client originally downloaded. The conflict is detected by the server and conflict resolution is initiated. The server is the first level of conflict resolution. The server can compare the conflicting versions of the resource to determine if the changes are not actually conflicting. If the server can resolve the conflict, it does and returns a resource tag to the client. The second level of conflict resolution is at the client. The client typically has knowledge of a schema related to the resource which may enable the client to resolve conflicts that the server could not. If the neither the server of the client can resolve the conflict, an end user is needed to resolve the conflict. After the conflict is resolved, it is uploaded to the server and the client receives a new resource tag.

26 Claims, 4 Drawing Sheets

OTHER PUBLICATIONS

Goland, et al., RFC 2518, "HTTP Extensions for Distributed Authoring—WEBDAV," Feb. 1999.

Fielding, et al., RFC 2616, "Hypertext Transfer Protocol—HTTP/1.1," Jun. 1999.

Yavin, D., "Replication's Fast Track," BYTE, Aug. 1995, pp. 88a–88d, 90.

Martin, J., "Design and Strategy for Distributed Data Processing," Prentice Hall, Inc., pp. 272–305, 1981.

* cited by examiner

SYSTEMS AND METHODS FOR DETECTING AND RESOLVING RESOURCE CONFLICTS

BACKGROUND OF THE INVENTION

1. The Field of the Invention

The present invention relates to systems and methods for replication and synchronization of data or resources between servers and client. More specifically, the present invention relates to systems and methods for detecting and resolving conflicts as resources are replicated between servers and clients.

2. The Prior State of the Art

Technology is increasing and expanding at an incredible rate and is permitting computers to be integrated into many different facets of people's lives. People are able to use computers to expand the confines of their own hard drive. Instead of simply performing tasks such as word processing and being limited to the information that can be locally stored, people are increasingly connected to networks which expand the amount of information that is available to them.

The information available across a network, including the Internet, can be downloaded quickly. More importantly, the data or information can be downloaded as needed. For example, many businesses have implemented a network where documents and other resources are stored on a server that is accessible by all clients instead of storing all of a business's documents and resources on each local hard drive. Clients are able to access only the resources that they require from the server. After the resource has been modified or used, it is restored on the server and is available for another client. In some instances, the same document can be accessed by more than one client simultaneously. A significant drawback of this arrangement is that the resource must be downloaded every time the client needs to work with the resource.

The internet, local area networks, intranets and business computer networks are becoming more sophisticated and complex which enables businesses and individuals to share information more quickly and easily. Interoffice email and calendaring applications are becoming a necessity as networks become an integral part of business. Never before has so much information been readily available and accessible by individuals and businesses.

This ability to access and share data has led to some rather unexpected problems. For instance, it is difficult to work on a network resource when a person or client is not connected to the network. Even if the resource is downloaded before the client goes offline, the client is not assured of working on the most recent version of the data or resource. In fact, the client may overwrite the changes of another client when the changed resource is uploaded to a server. However, the ability to access network resources while offline is a pressing need in today's age of portable computers.

Another problem is related to the amount of network traffic as the clients connected to a network download resources, upload resources, transmit email, read email and utilize calendar applications and use the resources of a computer network. In fact, the speed of a network can be significantly impaired by the amount of traffic or data that is being transmitted over the network. In a system having more than one server, these problems are partially solved by having server-to-server data replication to insure that each server has the most recent version of a resource. This is much more difficult to perform with client, because they are not always connected to the network and are not easily accessible by other clients.

Replication, however, has the potential to reduce network traffic and make clients more efficient, but there are several problems related to server to client replication. One issue to be addressed is minimizing the transfer of resources over the network while ensuring that the client has the most up to date version of a resource. Another issue to be addressed is related to the conflicts which may exist between the resources stored on the clients and the resources stored on the servers.

Conflicts between a client copy of a resource and a server copy of a resource can occur because multiple copies of a particular resource can reside on multiple servers and multiple clients. A simple example of this conflict is where two clients have downloaded a resource from a server. The first client deletes a portion of the resource and uploads the altered resource to the server. The second client adds a different portion to the resource, but does not delete the portion deleted by the first client. The second client then uploads the changed resource to the server. In this scenario, the portion deleted by the first client is in effect restored because the version of the first client was overwritten by the changes made by the second client. Conflicts present a difficult problem.

One solution to this problem is to only allow a single client to download a particular resource. While this solution prevents conflicts between multiple copies of a resource, the ability to share data and work collaboratively with a resource is severely hampered. Another solution to the conflict problem is to initiate an arbitration process between the entities involved in the conflict. While this solution may resolve the conflict, the process produces a significant amount of network traffic and may require the interaction of an end user, both of which lower the efficiency of the network and the users. This problem is magnified when multiple servers and clients are involved in the arbitration process.

Because of the eventuality of a conflict between the copies of resources on clients and the copies of resources on the servers, it is desirable and would be an advance in the art to be able to detect and resolve conflicts. It would also be an advance in the art to minimize the amount of network traffic needed to resolve the conflict.

SUMMARY OF THE INVENTION

The present invention is directed to detecting and resolving conflicts that may occur during resource replication or synchronization between servers and clients. In most computer networks, a client has the ability to download copies of resources stored on servers. The client also has the ability to use the downloaded copy and may ultimately desire to upload any changes to the resource on the servers, which has the effect of replacing the version of the resource on the server with a new updated version. Because the resource on the server may be available to more than one client, it is possible that two clients may attempt to alter a resource which will most likely result in a conflict which needs to be detected and resolved.

In effect, resources stored on a server are frequently altered. Each alteration results in a new version of the resource. Each version of each resource is identified by a resource tag which identifies a particular version of a particular resource. Resource tags are generated by the server and are typically much smaller in size than the resource and occupies less network bandwidth when transmitted over a network. Every time a resource is changed, a new resource tag is created. This idea of a resource tag is key because it allows conflicts between copies of a resource to be detected.

When a client downloads a resource, the resource tag is also transmitted to the client and the client keeps track of the resource tag. After the client has made changes to the resource and desires to upload the changes to the server, the resource tag is transmitted to the server. The server compares the value of the resource tag sent by the client with the value of the resource tag maintained by the server and if the resource tags match, then the client is uploading changes to the version of the resource that was downloaded. If the resource tags do not match, then a change was made to the resource that the client is unaware of and a conflict is thereby detected.

Once a conflict has been detected, it must be resolved. An exemplary method used to resolve the conflict has three stages or levels, each of which may be independent of the others. The first level of conflict resolution occurs at the server. The server recognizes that a conflict exists, by comparing the resource tags, and may evaluate the conflicting resources to determine if the conflict can be resolved by the server. Resolving the conflict at the server provides the advantage of reducing network traffic as well as relieving an end user of the task of resolving the conflict.

If the conflict cannot be resolved by the server, the second level of conflict resolution is initiated. Preferably, the second level of conflict resolution occurs at the client. The client is notified by the server that the conflict could not be resolved at the server and the server provides the client with information about the conflicting copies of the resource. This information, or conflict resource, may be limited to only the parts of the resources that were changed or may be as expansive as to include a complete copy of each conflicting copy of the resource. The client attempts to resolve the conflict by, for example, incorporating additional information about the operation that created the conflict or by using knowledge of the scope of operations that are known to the client, but not to the server. In general, the client typically has more ability to resolve a conflict because a client is familiar with the schema within which the resource was changed. Knowledge of this schema may assist the client in resolving the conflict. If the client cannot resolve the conflict, then an end user is involved who typically resolves the conflict.

Once a conflict has been resolved, the resource is stored on the server, and a new resource tag is generated, if necessary. The resource tag is provided to the clients in cases where this is required. In this manner detecting and resolving resource conflicts minimizes the amount of network bandwidth needed to resolve the conflict. Also the intervention of an end user is preferably used as a final remedy.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other advantages and objects of the invention are obtained, a more particular description of the invention briefly described above will be rendered by reference to specific embodiments thereof which are illustrated in the appended drawings. Understanding that these drawing depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
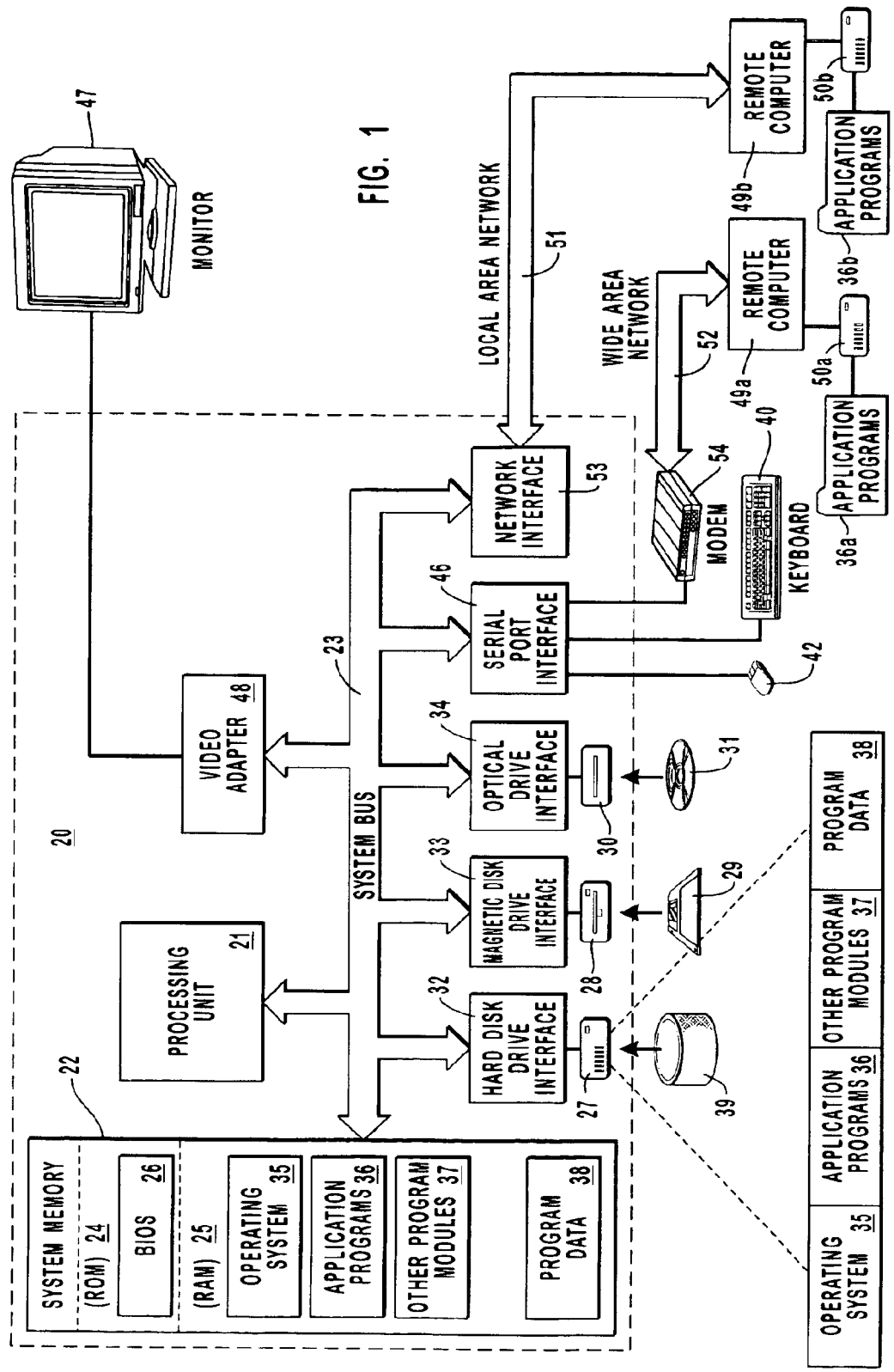
FIG. 1 illustrates an exemplary system that provides a suitable operating environment for the present invention.

When data is replicated from server to client and from client to server, there is always a possibility that a conflict may exist between the client copy of the resource and the server copy of the resource. Detecting and resolving resource conflicts is important in order to assure resource integrity. Without conflict detection and resolution, a client cannot be assured of the status of a resource stored on a server. Conflict detection and resolution allows a client to upload a resource to a server without the fear of overwriting the changes made to the resource by another client.

Conflict resolution can occur at the server, the client or with an end user. Preferably the resolution occurs at the server, in part because the conflicting resources need not be transmitted over the network. Also, the end user need not be involved in resolving the conflict. Thus, conflict resolution makes a network more efficient and relieves an end user of having to resolve some conflicts. Conflict resolution can also occur at a client, but the client preferably attempts to resolve the conflict only if the server is unable to fix the conflict. Finally, an end user becomes involved in the conflict resolution only if both the server and the client are unable to resolve the conflict.

The invention is described below by using diagrams to illustrate either the structure or processing of embodiments used to implement the systems and methods of the present invention. Using the diagrams in this manner to present the invention should not be construed as limiting of its scope. The present invention contemplates both methods and systems for detecting and resolving resource conflicts. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprises for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics; network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose-computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically includes many or all of the elements described above relative to the computer 20, although only memory storage devices 50a and 50b and their associated application programs 36a and 36b have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

As used herein, server refers to computer hardware and software that manage network resources. Client, as used herein is an application or software that is executing on a computer that relies on the server to perform some operations. Download refers to the transfer of data from the server to the client and upload refers to the transfer of data from the client to the server. In some instances a read operation is equivalent to a download and a write operation is equivalent to an upload.

Figure 2:
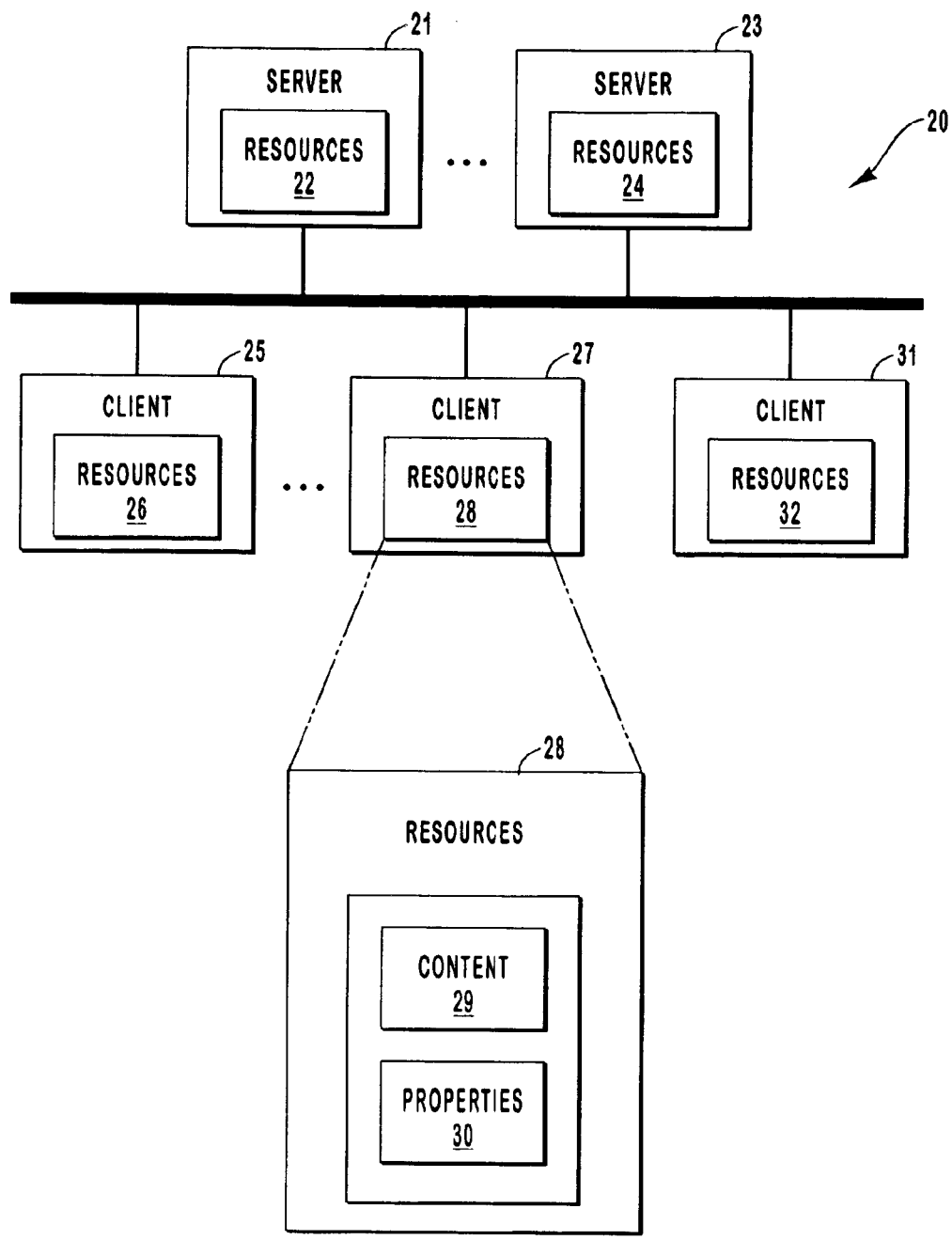
FIG. 2 is a block diagram of an exemplary network for implementing embodiments of the present invention.

FIG. 2 is a block diagram illustrating an exemplary network environment in which the systems and methods of the present invention may operate. Network 20 comprises a plurality of servers and clients, each of which has resources. Resources, as used herein, refers to objects in a namespace that may be referred to by a Uniform Resource Identifier (URI) and include, but are not limited to, files, folders, directories, collections, documents, spreadsheets, emails, messages and others. A collection, in one embodiment, is a group of resources.

An important aspect of the plurality of servers in network 20 is that they may be versioning servers, which is capable of tracking and storing different versions of a particular resource. When a change is made to a resource, the current and the old versions of the resource are tracked. The methods and systems of the present invention may be applied to versioning servers as well as other types of servers.

Resource 28 in FIG. 2 illustrates one embodiment of a resource. Resource 28 has content 29 and properties 30. If resource 28 is an email, then content 29 corresponds to the actual text of the message and properties 30 may refer to a variety of items which may include the size of the email, the sender of the email, and the importance of the email. There are many more properties which can be associated with a resource that are not detailed herein.

In a preferred embodiment, the resources of a network are accessed and replicated using WebDAV methods and XML elements. The methods implemented by embodiments of the present invention are similar to the methods defined in HTTP with the difference that replication is supported. These methods and elements will be discussed as necessary with respect to various embodiments of the present invention. An important aspect of the WebDAV methods and XML elements is that they provide support for conflict detection and conflict resolution. For instance, the GET method allows a client to include a resource tag such that the resource is downloaded only if the server copy of the resource is different from the copy of the resource on the client. In the alternative, the GET method allows a client to download a particular version of a resource by identifying the particular version with the resource tag.

The resources of the servers in network 20 may or may not be identical. In many instances resources are replicated across servers and each client can therefore access a particular resource from one or more servers. The resources that are the same are typically replicated between the servers such that the most current version of a particular resource is available to the clients. Additionally, a client has the ability to synchronize or replicate its resources with the resources of the servers. One objective of synchronization or replication is to avoid downloading data that has already been downloaded by a client. As described previously, a GET method may include a resource tag which may be used to determine if a download of the contents of the resource is necessary. This reduces network data traffic and enables clients to be more efficient when they are connected to the network as well as when they are not connected to the network because they may work on the resources even when not connected to network 20.

For example, when client 25 connects to network 20 for the first time, resources 22 and resources 24 are not physically present on client 25. Client 25 has the ability to download resources from either server 21 or server 23. Client 25 may download all or part of resources 22 and resources 24. In addition to the resources downloaded by client 25, client 25 receives an identifier which is indicative of state of the resources that were requested and downloaded by client 25. The identifier is a binary stream that represents the state of the contents of a collection and is more fully described in co-pending U.S. patent application Ser. No. 09/412,739 entitled "METHOD, COMPUTER READABLE MEDIUM, AND SYSTEM FOR MONITORING THE STATE OF A COLLECTION OF RESOURCES", filed on Oct. 4, 1999, now U.S. Pat. No. 6,694,335 which assigned to the same assignee as the present application, and which is hereby incorporated by reference. Also, the client receives a resource tag for each resource.

After client 25 has downloaded resources 26, client 25 may disconnect from the network and use resources 26, which were downloaded from servers 21 and/or 23. When client 25 reconnects to network 20 at a later time, client 25 can send its identifier to server 21 or 23 and the server will make a determination of what has changed since client 25 downloaded by comparing the identifier of the client with the current identifier maintained by the server. After the server has compared the identifier sent by the client with the current identifier of the collection, the server sends client 25 the current identifier and a manifest indicating the resources that have changed. The manifest may include the resource tags of the resources that the client has not yet downloaded. This allows client 25 to download only those resources that have changed using the GET method rather than download all the resources again. Thus, a client is relieved of having to repeatedly download resources and network traffic is reduced. In a preferred embodiment, a client will only have to download a resource one time.

In this manner, the resources are available for use by client 25 as if client 25 were connected to network 20 at all times. The systems and methods needed to replicate, synchronize and store the resources between servers and clients is more fully described in co-pending U.S. patent application Ser. No. 09/412,766 entitled "Method and System for Supporting Off-Line Mode of Operation and Synchronization", filed on Oct. 4, 1999 now U.S. Pat. No. 6,578,054, which assigned to the same assignee as the present application, and which is hereby incorporated by reference. In one embodiment, replication is a process initiated by a client of retrieving a manifest from a server, downloading the resources that have been changed by other clients and uploading the resources changed by the client to the server. In this manner, the client has a current and complete local copy of the resources on the server.

As previously described, one objective of the present invention is to only download a resource, a group of resources, or a collection once and the identifier enables the client to meet this objective which has the effect of reducing network traffic and permitting the client to work with up to date information even if the client is not connected to the network or is offline. The resources downloaded from the servers are cached by the client such that the client has offline access to resources. When the client reconnects with network 20 or is again online, replication or synchronization as described previously may occur.

The identifier is generated and maintained by the server. The client, in a preferred embodiment, is unable to interpret the contents of the identifier, but simply stores the identifier as indicative of the status of a collection or resource located on a server. Another identifier generated by a server is a resource tag which indicates the status or state of a particular resource. In other words, the resource tag identifies a particular version of a particular resource. When a client seeks a new identifier and manifest from a server, the resource tags of the resources that have changed are returned to the client in the manifest.

A resource tag cannot be understood or generated by a client, but a client is capable of comparing two or more resource tags. The comparison preferably performed determines whether the resource tags are identical or have exact equality. In a preferred embodiment, the client stores resource tags in order to reflect the state of the replicated resource. The resource tag is therefore useful and is in fact preferred if a client desires to detect and resolve resource conflicts. Resource tags are more fully described in copending U.S. patent application Ser. No. 09/412,071 entitled "METHOD, DATA STRUCTURE, AND COMPUTER PROGRAM PRODUCT FOR IDENTIFYING A NETWORK RESOURCE", filed on Oct. 4, 1999 now U.S. Pat. No. 6,578,069, which assigned to the same assignee as the present application, and which is hereby incorporated by reference.

Figure 3:
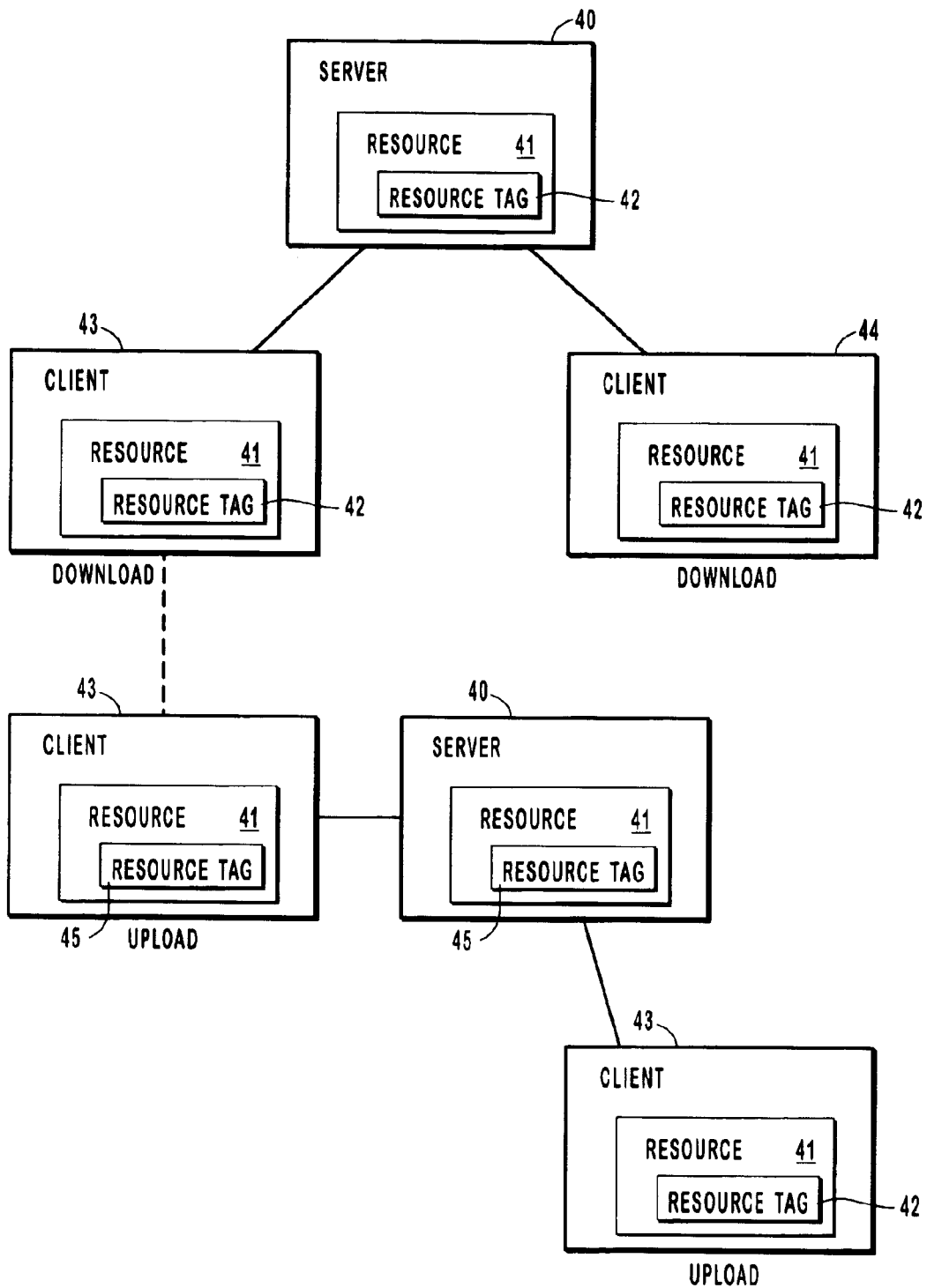
FIG. 3 is a block diagram illustrating how a resource conflict may occur between a copies of the resource stored on clients and servers.

Because a conflict occurs when there is a difference between the server copy of the resource and the client copy of a resource, resource tags are particularly useful for detecting and resolving conflicts. FIG. 3 is a block diagram illustrating one situation where a conflict may occur and is illustrative of server side conflict detection. Server 40 of FIG. 3 has resource 41 and server 40 has generated resource tag 42 which is a property of resource 41 and identifies a particular version of resource 41.

In this embodiment, the GET method is used to retrieve resource 41 from server 40 by clients 43 and 44. In order to provide conflict detection, server 40 must also provide resource tag 42 to each client requesting to download resource 41. Thus, both client 43 and client 44 each have a copy of resource 41 and a copy of resource tag 42. Next, client 43 alters resource 41 and uses the PUT method to update the existing resource 41 on server 40. In a PUT method, the client's saved resource tag may be sent in an IF header. Server 40 compares the resource tag provided by client 43 in the IF header with the resource tag maintained by the server and if the resource tag provided by client 43 matches the resource tag stored on server 40, then the PUT is allowed. Because resource 41 has changed, a new resource tag 45 is generated by server 40 and returned to client 43 to indicate the version of resource 41 stored on client 43. Thus both client 43 and server 40 have identical versions of resource 41 as indicated by the respective values of the resource tags.

In this example, client 44 attempts to update resource 41 using a PUT method with an if header containing the client's saved copy of resource tag 42. In this case, client 43 has already altered resource 41 and resource tag 42 provided by client 44 does not match the current resource tag 45 of resource 41. Because the resource tags do not match, server 40 detects a conflict and client 44 is not allowed to PUT the resource until the conflict is resolved. Conflicts may be created in other situations, and the conflict is typically detected by comparing resource tags.

Figure 4:
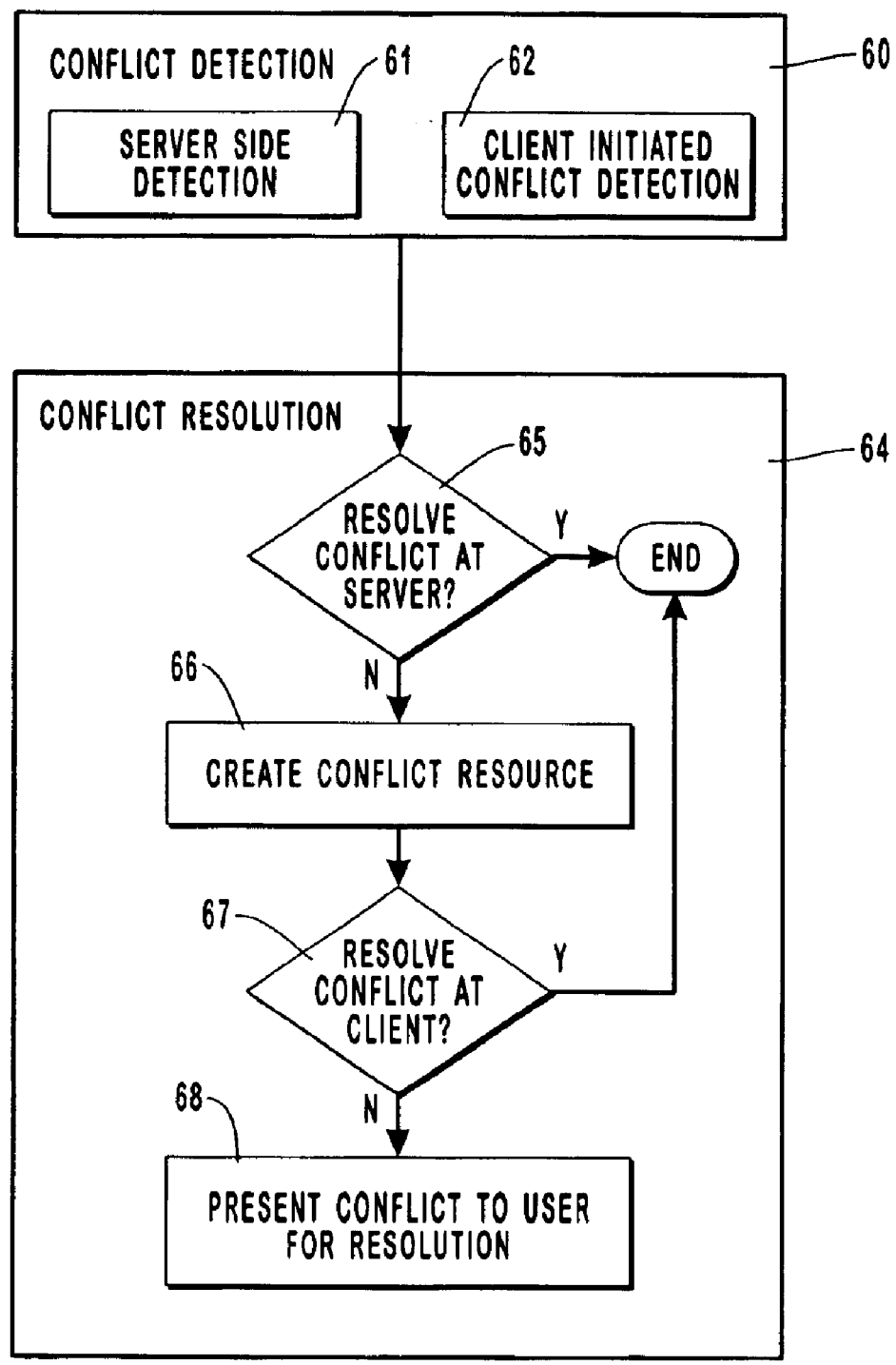
FIG. 4 is a flow chart of one embodiment for detecting and resolving resource conflicts.

After a conflict has been detected, the next step is to resolve the conflict and FIG. 4 is a flowchart illustrating an exemplary method for resolving a conflict. In step 60, the conflict is detected. Server side detection 61, as previously described, is one method for detecting a conflict. Another method for detecting a conflict is client initiated conflict detection 62, which occurs when a resource downloaded by a first client is updated online by a second client while the first client was offline.

In this instance, the first client downloads the resource and its resource tag using, for example, a web browser. When the client then replicates or synchronizes with the server, the client requests an updated identifier and a new manifest by transmitting the identifier currently saved and stored by the client in the communication sent to the server. Because the resource in question has changed, the server returns the new resource tag to the client in the manifest. The client then compares the resource tag in the manifest with the resource tag which was downloaded using the web browser. If the resource tags match, then the client need not perform a download on the changed resource because the most recent version is already present on the client. As described earlier, while the resource tag is not understood by the client, the client does have the capability of comparing resource tags. This ability enables a client to perform client side conflict detection. This is an example of client initiated conflict detection.

Step 64 involves the methods and processes of resolving the detected conflict. Objectives of conflict detection and resolution include minimizing the amount of network traffic, limiting the necessity of having an end user resolve the conflict, and increasing efficiency. Each sub-step of conflict resolution step 64 is independent of the other sub-steps, but the sub-steps are preferably executed in a prescribed order. Thus, the first sub-step to be executed is step 65, which is a server level conflict resolution step where the server attempts to resolve the conflict.

Because the server has detected the conflict, the server has an opportunity to resolve the conflict without having the client or the end user involved in the conflict resolution. By resolving the conflict at the server, the resource does not necessarily need to be downloaded to the client, which meets one of the objectives. If the copy of the resource stored by the client is not the copy of the resource that is stored on the server after the conflict is resolved by the server, then the client will have to download the resource again.

In a preferred embodiment, the server attempts to resolve the conflict by comparing the client version of the resource with the server version of the resource. In other words, the server is comparing the changes requested by the client with the existing state of the resource. If the server determines that the changes requested by the client and the existing state of the resource are semantically equivalent, then the conflict may be resolved at the server level. For instance, if two clients both changed a property, such as the author property, to the same person, then when the second client attempts to upload the resource properties, the resource tags will not match. The server, however, can determine that there is no real conflict because the resources are equivalent and will simply return the new resource tag to the second client. The server can also resolve a conflict if the conflicting resources are the same when compared on a binary basis or a byte basis. If the resources match when compared on a byte-to-byte basis, then the server can resolve the conflict. Additional logic may be added to the server to allow it to expand and increase its ability to detect and resolve conflicts.

If the server is unable to resolve the conflict, then a conflict resource is preferably created in step 66, which may contain the conflicting versions of the resource. The resource conflict may simply contain a set of differences existing between the conflicting copies of the resource. In essence, the conflict resource is generated to contain information that may assist the client in resolving the conflict. In fact, a conflict resource may not be generated in some instances. Rather, the client has the option of simply retrieving the server's copy of the resource at which point the client attempts to resolve the conflict between the server copy of the resource and the client copy of the resource.

In a preferred embodiment, a conflict resource is generated and transmitted to the client and in step 67. The client has an opportunity to evaluate the conflict resource and determine whether the conflict can be resolved without interaction from the end user. Frequently, a client is in a better position to evaluate a conflict resource and determine if the conflict can be resolved because the client is familiar with the schema of the resource. A schema can be a structure of a database system or in a relational database and the schema defines the fields and tables of the system as well as the relationships between the fields and tables. In a broader sense, a schema is an environment in which the resource or data is created and utilized.

For instance, if a meeting is scheduled in a calendar application and the first client dismisses the meeting at a certain time and the second client dismisses the meeting at a later time, a conflict resource is generated because the second client is attempting to set the dismiss property which was already altered by the first client. The client, which has knowledge of how the calendar application operates, is able to resolve this conflict without involving the end user. The client can recognize that the change of each client had the effect of dismissing the meeting. The client can resolve the conflict by leaving the server copy of the resource unaltered, and simply updating its own local copy of the resource tag with the server's current resource tag. This avoids any unnecessary or redundant changes to the server data, as well as changes to the server's resource tag, which would cause all other clients to identify their copies of the resource as old and cause the clients to download the resource again. Resolving the conflict at the client is an example of client level conflict resolution.

In some situations, it might be possible for the server to have similar knowledge of various schemas, allowing the server to recognize two changes as being identical. If is preferable that the server resolve resource conflicts, resulting again in reduced network traffic without requiring creation of a conflict resource, transmission of a conflict resource, or intelligence in the client to correctly detect that two changes are equivalent. If the server cannot resolve the conflict, it is preferable that the client resolve the conflict.

If the client is unable to resolve the conflict, then the conflict resource is presented to the end user for resolution in step 68. The user is presented with the different versions of the resource as well as the conflict and the user is able to remedy the conflict. After the conflict is resolved in step 68, the resolved resource is uploaded to the server and a new resource tag is returned. In sum, conflict resolution can be viewed as occurring in stages or levels. The first level involves resolution at the server, the second level of conflict resolution occurs at the client and the third level of conflict resolution is the interaction with the end user and as previously mentioned, it is preferable for the server to resolve the resource conflict.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system capable of replicating a server copy of a resource stored on one or more servers with a client copy of the resource stored on one or more clients, a method for resolving a resource conflict so that the client copy of the resource can be updated to the one or more servers without overwriting any changes made to the resource by another client, the method comprising the steps of:

determining that a conflict exists between the server copy of the resource and the client copy of the resource if a server resource tag that is representative of the server copy of the resource does not match a client resource tag that is representative of the client copy of the resource;

determining, at the server, whether the server can resolve the conflict between the server copy of the resource and the client copy of the resource into a single version of the resource;

creating, by the server, a conflict resource containing information about the conflict between the server copy and the client copy of the resource, if the conflict cannot be resolved at the server;

evaluating, at the client, whether the conflict resource can be resolved into a single version of the resource in accordance with additional information, known to the client but not the server, regarding a client operation that created the conflict, if the conflict was not resolved at the server; and presenting the conflict resource to a user if the conflict resource cannot be resolved by the client.

2. The method as defined in claim 1, wherein the step of determining further comprises the step of resolving the conflict at the server.

3. The method as defined in claim 1, wherein the step of determining further comprises the step of comparing the client copy of the resource with the server copy of the resource.

4. The method as defined in claim 1, wherein the conflict resource comprises the server copy of the resource and the client copy of the resource.

5. The method as defined in claim 1, wherein the step of evaluating further comprises the step of resolving the conflict at the client in accordance with the schema.

6. The method as defined in claim 1, further comprising the steps of:

uploading the resolved conflict resource to the server; and returning a new resource tag to the client from the server.

7. In a system capable of replicating a resource from one or more server to one or more clients, a computer program product for implementing a method of detecting and resolving resource conflicts so the one or more clients can upload the resource to the one or more servers without overwriting any changes made to the resource by another client, the computer program product comprising:

a computer readable medium carrying computer executable instructions for implementing the method, wherein the computer executable instructions comprise:

program code means for comparing a client resource tag with a server resource tag, wherein the client resource tag and the server resource tag are each representative of a version of the resource;

program code means for determining that no conflict exists between a client version of the resource and a server version of the resource if the client resource tag and the server resource tag match, program code means for resolving a conflict at the server into a single version of the resource if the client resource tag and server resource tag fail to match;

program code means for creating conflict resource contain information about the conflict between the server copy and the client copy of the resource, if the conflict cannot be resolved at the server;

program code means for resolving the conflict at the client into a single version of the resource by evaluating the conflict resource in accordance with additional information, known to the client but not the server, regarding a client operation that created the conflict; and program code means for presenting the conflict resource to an end user for conflict resolution if the client cannot resolve the conflict.

8. The computer program product as in claim 7, wherein the computer executable instructions further comprise:

program code means for uploading the resolved conflict resource to the server; and program code means for providing the client with a new resource tag.

9. The computer program product as defined in claim 7, wherein the conflict resource comprises the server copy of the resource.

10. The computer program product as defined in claim 7, wherein the conflict resource comprises the server copy of the resource and the client copy of the resource.

11. The compute program product as defined in claim 7, wherein the conflict resource comprises a set of differences existing between the server copy of the resource and the client copy of the resource.

12. The computer program product as defined in claim 7, wherein the conflict resource comprises information useful to the client for resolving the conflict.

13. The computer program product as defined in claim 7, further comprising program code means for executing a server level of conflict resolution.

14. The computer program product as defined in claim 13, wherein the program code means for executing a server level of conflict resolution further comprises program code means for resolving the conflict.

15. The computer program product as defined in claim 7, further comprising program code means for executing a client level of conflict resolution which comprises program code means for comparing the changes made to the client copy of the resource and the server copy of the resource.

16. The computer program product as defined in claim 7, further comprising program code means for uploading the resolved conflict resource to the server.

17. The computer program product as defined in claim 16, further comprising program code means for returning to the client a new resource tag, wherein the new resource tag identified the current version of the server copy of the resource and the client version of the resource.

18. In a system capable or replicating a resource between a client and a server, a computer program product for implementing a method of detecting and resolving a conflict between a client copy of the resource and a server copy of the resource so that the client can upload the resource to the server without overwriting any changes made to the resource by another client, the computer program product comprising:

a computer readable medium carrying computer executable instructions for implementing the method, wherein the computer executable instructions comprise:

program code means for receiving a client resource tag at a server, the client resource tag identifying a client version of the client copy of the resource, program code means for comparing, by the server, the client resource tag with a server resource tag that identifies a server version of the server copy of the resource, program code means for determining that there is a conflict between the client copy of the resource and the server copy of the resource if the client resource tag does not match the server resource tag; and program code means for executing one or more levels of conflict resolution until the conflict is resolved into a single version of the resource, wherein a first level of conflict resolution comprises a server level of conflict resolution, a second level of conflict resolution comprises a client level of conflict resolution and a third level of conflict resolution requires an end user to resolve the conflict.

19. The computer program product as in claim 18, wherein the program code means for executing one or more levels of conflict resolution further comprise:

program code means for executing a server level of conflict resolution to resolve a server copy of a resource and a client copy of a resource having one or more conflicts into a single version of the resource;

program code means for executing a client level of conflict resolution to resolve a server copy of a resource and a client copy of a resource having one or more conflicts into a single version of the resource; and program code means for executing a third level of conflict resolution to thereby resolve a server copy of a resource and a client copy of a resource having one or more conflicts into a single version of the resource.

20. The computer program product as defined in claim 18, wherein the program code means for executing one or more levels comprises program code means for executing the server level of conflict resolution at the server.

21. The computer program product as defined in claim 18, wherein the program code means for executing one or more levels comprises program code means for executing the client level of conflict resolution at the client.

22. The computer program product as defined in claim 18, wherein the program code means for executing one or more levels comprises program code means for executing the third level of conflict resolution.

23. The computer program product as defined in claim 18, wherein the program code means for executing one or more levels comprises program code means for resolving the conflict in accordance with a schema.

24. The computer program product as defined in claim 23, wherein the schema is known to the server.

25. The computer program product as defined in claim 23, wherein the schema is known to the client.

26. The computer program product as defined in claim 18, wherein the program code means for executing one or more levels comprises program code means for uploading the resolved resource to the server and transmitting a new resource tag to the client.

* * * * *

UNITED STATES PATENT AND TRADEMARK OFFICE
CERTIFICATE OF CORRECTION

| | |
|---|---|
| PATENT NO. | : 6,944,642 B1 |
| APPLICATION NO. | : 09/412738 |
| DATED | : September 13, 2005 |
| INVENTOR(S) | : Alexander I. Hopmann et al. |

It is certified that error appears in the above-identified patent and that said Letters Patent is hereby corrected as shown below:

In column 1, line 67, delete "client," and insert -- clients --, therefor.

In column 5, line(s) 8-9, delete "comprises" and insert -- comprise, --, therefor.

In column 5, line 34, delete "electronics;" and insert -- electronics, --, therefor.

In column 6, line 1, after "instructions" insert -- , --.

In column 13, line 23, in Claim 11, delete "compute" and insert -- computer --, therefor.

Signed and Sealed this

Eighth Day of September, 2009

David J. Kappos
*Director of the United States Patent and Trademark Office*